United States Patent [19]

Dartnell

[11] 4,182,198

[45] Jan. 8, 1980

[54] PEDAL CONTROL UNITS

[76] Inventor: Jack Dartnell, Diplocks Way, South Rd., Hailsham, East Sussex, England, BN273JF

[21] Appl. No.: 769,505

[22] Filed: Feb. 17, 1977

[30] Foreign Application Priority Data

Jan. 11, 1977 [GB] United Kingdom ............ 855/77

[51] Int. Cl.² .......................................... G05G 1/14
[52] U.S. Cl. .......................................... 74/513; 74/560
[58] Field of Search ............. 74/512, 513, 514, 560, 74/561, 562, 562.5, 563, 478, 478.5, 474, 877, 879; 192/0.098, 0.096

[56] References Cited

U.S. PATENT DOCUMENTS

| 202,312 | 4/1878 | Warner | 192/95 |
|---|---|---|---|
| 1,255,220 | 2/1918 | Petry | 74/512 |
| 1,473,754 | 11/1923 | Bailhe | 74/513 |
| 2,133,275 | 10/1938 | Andres et al. | 74/512 X |
| 2,369,056 | 2/1945 | Langdon et al. | 74/512 |
| 2,401,716 | 6/1946 | Williams | 74/512 |
| 2,408,446 | 10/1946 | Ralston | 74/512 |
| 2,808,705 | 10/1957 | Ingres | 74/512 X |
| 2,823,557 | 2/1958 | Lenning | 74/512 |
| 2,910,842 | 11/1959 | Sensenig | 64/4 |
| 2,928,293 | 3/1960 | Rockwell | 74/512 |
| 2,963,920 | 12/1960 | Hinsey | 74/512 X |
| 3,027,778 | 4/1962 | Risnes | 74/560 X |
| 3,088,331 | 5/1963 | Bachmann | 74/560 X |
| 3,315,540 | 4/1967 | Baumgartner | 192/95 |
| 3,375,777 | 4/1968 | Techtmann et al. | 74/582 X |
| 3,468,187 | 9/1969 | Payerle | 74/560 X |
| 3,611,748 | 10/1971 | Wallgren | 64/23 X |
| 3,857,304 | 12/1974 | Berndt | 74/877 |
| 4,018,103 | 4/1977 | Chamberlain | 74/520 X |

FOREIGN PATENT DOCUMENTS 2702350 8/1977 Fed. Rep. of Germany ............. 74/512

Primary Examiner—Samuel Scott
Assistant Examiner—Don E. Ferrell
Attorney, Agent, or Firm—Eyre, Mann, Lucas & Just

[57] ABSTRACT

An improved accelerator pedal unit for a vehicle including a pedal pivotally mounted on a mounting plate adapted to be secured to the floor of the vehicle. A tubular member rotatably mounted in the mounting plate extends downwardly through the floor of the vehicle and is integral with, or attached to, a housing located below the floor of the vehicle. First and second levers are pivotally mounted in the housing and a shaft extends up through the tubular member to couple the first lever to the accelerator pedal. The second lever, which is constrained to move with the first lever, is connected to the inner wire of a control cable leading to the carburetor of the vehicle.

14 Claims, 5 Drawing Figures

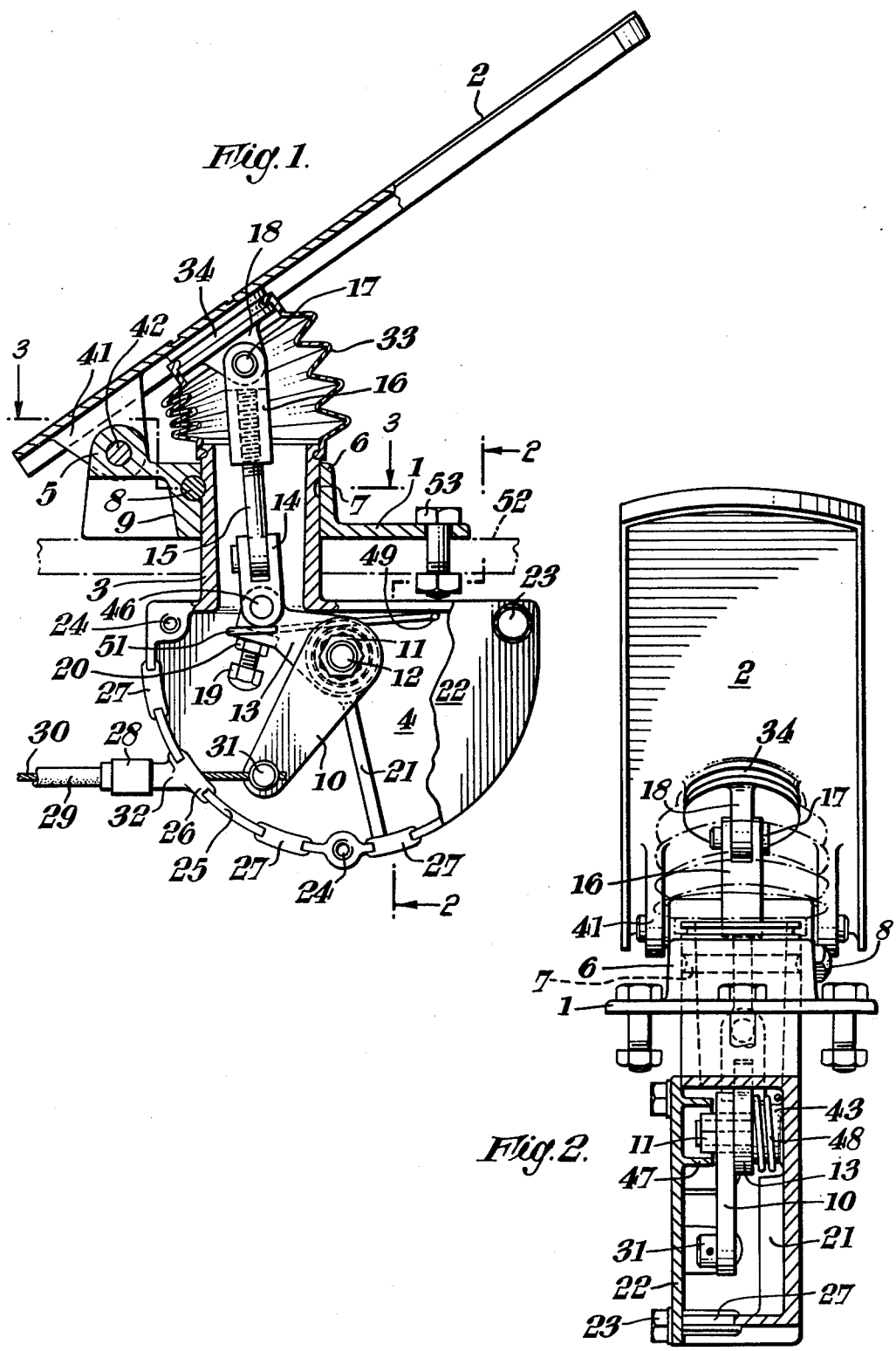

PEDAL CONTROL UNITS

This invention relates to pedal control units and it is an object of the invention to provide a pedal control unit which is particularly suitable for use as the accelerator pedal in a vehicle.

It is known to provide a pedal control unit for use in a vehicle in which the pedal is connected to the fuel supply control member by means of a flexible cable enclosed in a sleeve. Such an arrangement has advantages in that it obviates the necessity for the complicated series of levers and links which may otherwise be necessary to transfer movements of the accelerator pedal into corresponding movements of the fuel supply control member.

It is a particular object of the present invention to provide a pedal control unit which may be used in a number of different types of vehicle in which the throttle cable has to follow different routes between the accelerator pedal and the throttle control on the carburettor or other fuel supply device.

This and other objects are achieved by providing a pedal control unit including a mounting plate, a pedal mounted on said plate to pivot about an axis substantially parallel to said plate, a tubular member rotatably mounted in said plate and substantially perpendicular thereto, a housing located on the opposite side of said plate to said pedal, the interior of said housing being in communication with the interior of said tubular member, a lever pivotally mounted in said housing, coupling means passing through the interior of said tubular member and interconnecting said pedal and said lever, and means on said lever remote from its pivot axis for attaching a control cable.

Preferably a number of apertures are provided in the housing so that the control cable can pass through any desired one of these apertures. Preferably removable sealing means are provided to close the apertures not in use.

Preferably the lever is mounted for rotation about a shaft fixed in the housing together with a second lever which is coupled to the pedal by means of a shaft passing through the tubular member. Preferably the two levers can be secured together in a number of different relative angular positions to correspond to the use of different ones of said apertures as control cable exits from the housing.

Preferably the housing is provided with a removable cover and with sealing means between the cover and the remainder of the housing so that the housing constitutes a sealed enclosure.

Preferably an adjustable stop is provided in the housing to limit the extent to which the lever can be rotated about its pivot axis. This is a more satisfactory arrangement than providing an external adjustable stop for the accelerator pedal since it discourages adjustment of the stop by the driver of the vehicle.

Further features of the invention will be understood from the following description of the pedal control unit illustrated in the accompanying diagrammatic drawings, in which:

FIG. 1 is a side view of a pedal control unit in accordance with the invention, partly in section;

FIG. 2 is a rear view of the unit illustrated in FIG. 1, again partly in section;

Figure 3:
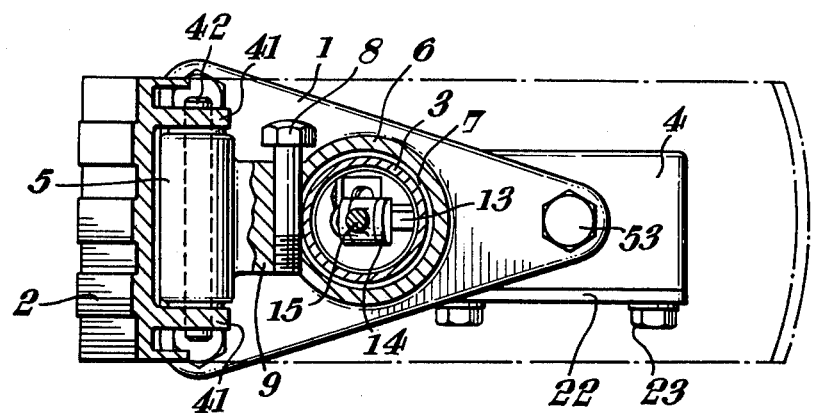
FIG. 3 is a plan view of the unit illustrated in FIGS. 1 and 2 with the pedal broken away to clarify details of the unit.
Figure 5:
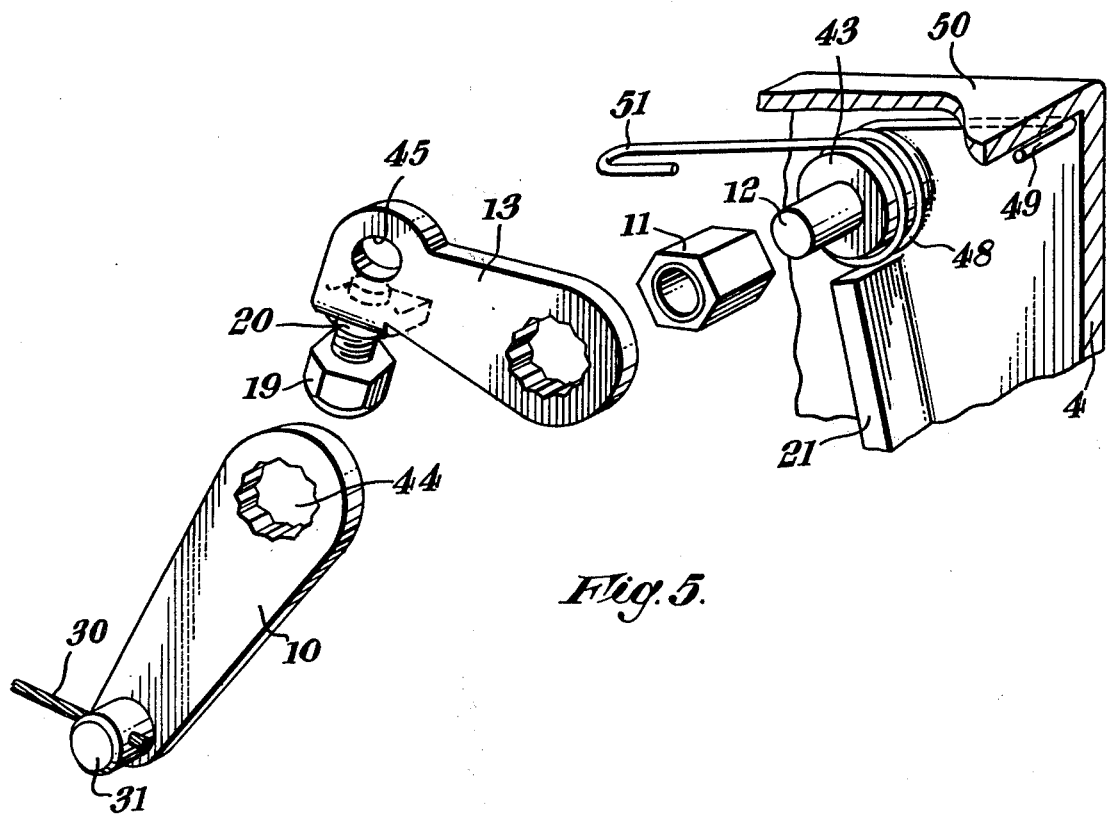
FIG. 5 is an exploded view of some of the components contained in the housing of the unit illustrated in FIGS. 1 to 4.
Figure 4:
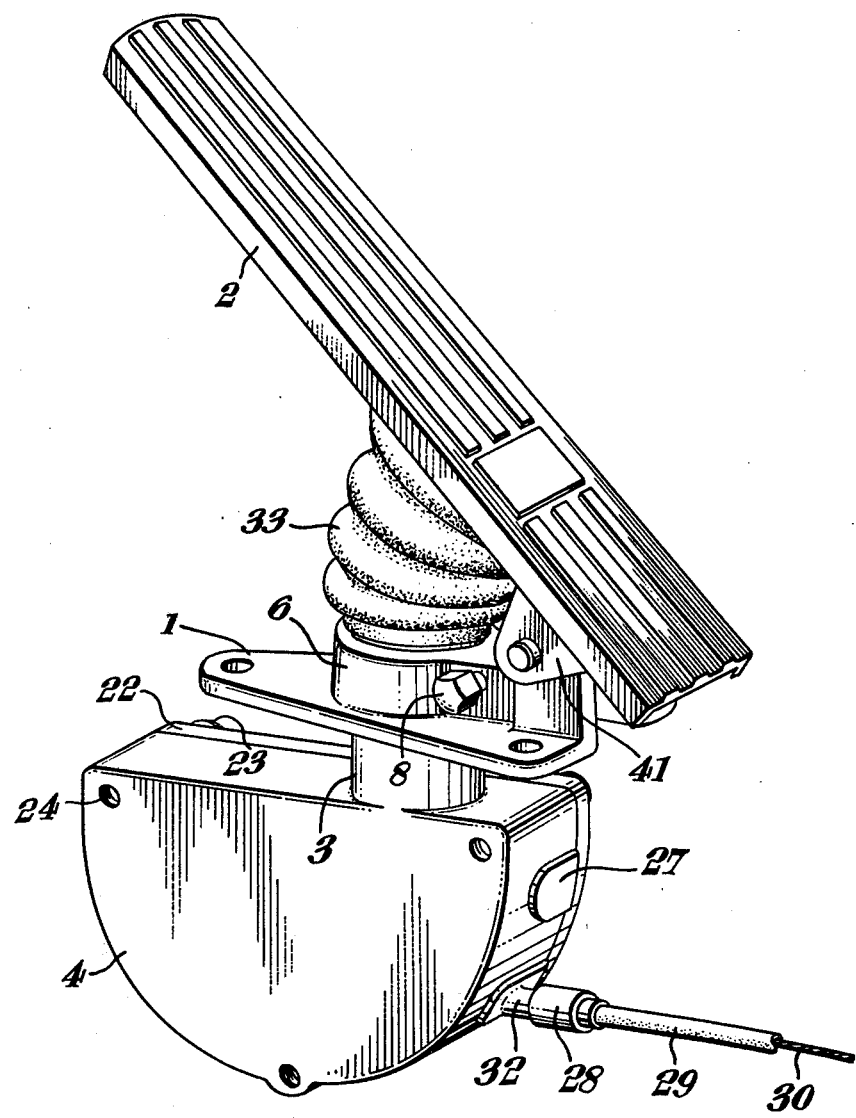
FIG. 4 is a perspective view of the pedal control unit illustrated in FIGS. 1 to 3.

It will be seen from the drawings that the unit illustrated includes a mounting plate 1, a pedal 2, a tubular member 3 and a housing 4. The pedal 2 includes a pair of dependent triangular plates 41 and a pivot pin 42 passes through holes in these plates and through a cooperating bore in an upstanding portion 5 of the mounting plate to provide a pivotal connection between the pedal and the mounting plate. The tubular member 3, which is integral with the housing 4, extends through a boss 6 which is integral with the mounting plate 1. An annular groove 7 is provided on the tubular member 3 and the tubular member may be locked in the mounting plate by means of a bolt 8 engaging in a threaded hole in a shoulder 9 extending between the upstanding portion 5 and the boss 6. The bolt 8 includes a tapered portion which engages with the groove 7 so that the tubular member may be locked in position by tightening the bolt 8.

A first lever 10 is removably mounted on a hexagonal sleeve 11 which is itself rotatably mounted on a pin 12 secured in a boss 43 projecting from the inner face of the housing 4. It will be seen that the lever 10 has a serrated hole 44 which fits the sleeve 11 and that, since the hole 44 has twelve serrations, the lever 10 can be mounted on the sleeve 11 in any one of twelve different angular positions. A second lever 13 is mounted in a similar manner on the sleeve 11 so that the two levers 10 and 13 are normally constrained to rotate together about the axis of the pin 12 but can be adjusted to any one of six different relative angular positions. The free end of the lever 13 is provided with a hole 45 and a clevis 14 is pivotally attached to the lever 13 by means of a pin 46 passing through the hole 45. The clevis 14 is pivotally connected to a shaft 15 which is threaded at its end remote from the clevis 14 to engage in a corresponding internal thread in a second clevis 16 which is pivotally connected by means of a removable pin 17 to a bracket 18 on the underside of the pedal 2. It will be seen that rotation of the pedal 2 about the axis of its pivot pin 42 causes corresponding rotation of the first lever 10 and the second lever 13 about the axis of the pin 12. Since the distance between the pivot axis 42 and the axis of the pin 17 is greater than the distance between the axis of the pin 12 and the axis of the pin 46, the lever 10 will turn through a greater angle than the pedal 2.

A spring 48 is wrapped round the boss 43 and one of its free ends 49 bears against a wall 50 of the housing 4. The other end 51 of the spring 48 embraces the second lever 13 and bears against the clevis 14. The spring is biased to rotate the lever 13 in a clockwise direction as seen in FIG. 1 and accordingly tends to restore the pedal to the position shown after it has been depressed.

It will be seen that the relative angular positions of the pedal and the second lever 13 can be adjusted by removing the pin 17 and rotating the clevis 16 so that the threaded rod 15 is withdrawn from, or drawn into, the clevis 16.

A bolt 19 is threaded in a hole in the second lever 13 and can be locked in position by means of a nut 20. The head of the bolt 19 engages with a web 21 formed in the housing 4 when the pedal is depressed, so that the amount of depression which is permitted can be adjusted by loosening the lock nut 20 and rotating the bolt 19 in the required direction.

The housing 4 is provided with a removable cover 22 held in position by bolts 23 engaging in threaded holes 24. A sealing gasket or lip is provided between the cover and the edge 25 of the housing and, if desired, the cover may consist of transparent synthetic resin material. The cover includes an annular projection 47 (FIG. 2) which extends over the outer end of the sleeve 11 and prevents the lever 10 from sliding off the sleeve so long as the cover is in position. If it is required to adjust the angular position of the lever 10, it is only necessary to remove the cover 22 and slide the lever 10 outwardly off the sleeve 11. The lever can then be replaced in the desired position.

In the embodiment illustrated, the housing 4 is provided with four apertures, any one of which may be used as a cable exit. The cable, which consists of an inner wire 30 and a flexible conduit 29, is shown leaving the housing through the aperture 26 and the remaining apertures are closed by removable pads 27 which may consists, for example, of synthetic resin material. The aperture 26 is provided with a conduit termination 32 which may also consist of synthetic resin material, and into which the conduit 29 fits. A metal sleeve 28 swaged over the conduit termination 32 secures the flexible conduit 29 in the termination 32. The inner wire 30 of the control cable is secured to a stud 31 pivotally mounted in the lever 10.

As shown in FIG. 1, a flexible bellows-type boot or gaiter 33 is fitted between a boss 34 on the underside of the pedal 2 and the upper end of the tubular member 3 to cover the linkage between the pedal and the second lever and to prevent the ingress of foreign material to the interior of the tubular member and the housing 4.

It will be understood that, when a pedal control unit in accordance with the invention is in use, the mounting plate 1 is secured to the floor 52 of the vehicle or the driver's cab thereof by means of nuts and bolts such as those shown at 53, and the tubular member 3 passes through said floor so that the housing 4 is located below the floor. The control cable 29,30 then extends from the housing 4 to the fuel control unit (not shown).

The tubular member 3 is secured in the mounting plate 1 in such a way that it is removable from the mounting plate and is also rotatable about its longitudinal axis with respect to the mounting plate. Thus, when a pedal control unit in accordance with the invention is to be fitted in a vehicle, the coupling means between the pedal and the lever is disconnected by removing the pin 17 and the tubular member 3, together with the housing 4, is removed from the mounting plate. The mounting plate is then secured to the floor of the vehicle with the pedal 2 located for convenient operation by the driver of the vehicle. The tubular member 3 is passed up from below the floor of the vehicle through a suitable aperture in the floor and is fitted into the mounting plate. At this stage the housing 4 may be rotated about the axis of the tubular member so that both the housing and the control cable are located in the most convenient position with respect to any other components located below the floor of the vehicle.

The tubular member is then locked in position by means of the bolt 8 and the coupling means connected between the pedal and the lever by replacing the pin 17.

What is claimed is:

1. A pedal control unit including:
   a mounting plate;
   a pedal mounted on said plate to pivot about an axis substantially parallel to said plate;
   a tubular member rotatably mounted in said plate and substantially perpendicular thereto;
   a housing rotatable with said tubular member located on the opposite side of said plate to said pedal,
   the interior of said housing being in communication with the interior of said tubular member;
   a level located in, and pivotally mounted in said housing;
   coupling means passing through the interior of said tubular member and interconnecting said pedal and said lever; and
   means on said lever remote from its pivot axis for attaching a control cable.

2. A pedal control unit according to claim 1, wherein said housing includes a plurality of cable exits, and wherein removable sealing means are provided to close the exits not in use.

3. A pedal control unit as claimed in claim 1, further including a flexible bellows extending between the pedal and the tubular member and surrounding a part of said coupling means.

4. A pedal control unit as claimed in claim 1, including spring means in said housing adapted to urge said pedal towards a raised position.

5. A pedal control unit according to claim 1 further comprising a plurality of cable exits in said housing, said cable exits being located at a plurality of angles with respect to the axis of said tubular member, any one of said cable exits being used for a cable exiting at a corresponding one of said plurality of angles and removeable sealing means sealing the remainder of said cable exits.

6. A pedal unit as claimed in claim 1, wherein the housing is provided with a removable cover, and wherein sealing means are provided between said housing and said cover.

7. A pedal unit as claimed in claim 6 further comprising flexible bellows extending between the pedal and the tubular member and surrounding a part of said coupling means, said flexible bellows, tubular member, housing, cover and sealing means together forming a substantially sealed communication enclosure, and one end of said control cable being located in said enclosure.

8. A pedal control unit as claimed in claim 1, wherein said lever is non-rotatably mounted on a sleeve which is itself rotatable about a shaft fixed in the housing, and wherein a second lever coupled to the pedal is also non-rotatably mounted on said sleeve.

9. A pedal control unit as claimed in claim 8, wherein said second lever is coupled to the pedal by means of a first clevis pivotally mounted on said second lever, a second clevis pivotally mounted on said pedal and an adjustable shaft extending between said first clevis and said second clevis.

10. A pedal control unit as claimed in claim 8, including an adjustable stop carried by said second lever and cooperating with abutment means fixed to said housing.

11. A pedal control unit as claimed in claim 8, further comprising cooperative means on said sleeve and at least said second lever for non-rotatably fixing said second lever on said sleeve in a selectable one of a plurality of angular relationships with said lever.

12. A pedal control unit comprising:
   a mounting plate having a boss;
   a pedal mounted on said mounting plate to pivot about an axis substantially parallel to said plate;

a tubular member rotatable in said boss;
a housing integral with said tubular member;
a lever located in, and pivotally mounted in said housing; and
coupling means passing through the interior of said tubular member and interconnecting said pedal and said lever.

13. A pedal control unit as claimed in claim 12, wherein said tubular member is provided with an annular groove, and wherein a tapered pin extending through said boss engages in said annular groove to retain the tubular member in the boss.

14. A pedal control unit as claimed in claim 12, wherein said housing includes a plurality of apertures, one of which is provided with a removable conduit termination to which is secured the outer conduit of a control cable and through which passes the inner wire of the control cable, the end of which is secured to a stud pivotally mounted in the lever.

* * * * *